2,967,190
PROCESS FOR THE PREPARATION AND PURIFICATION OF ALKYL MERCURIC SALTS

Heinrich Klös, Wuppertal-Elberfeld, Germany, assignor to Farbenfabriken Bayer Aktiengesellschaft, Leverkusen, Germany, a corporation of Germany No Drawing. Filed Oct. 12, 1956, Ser. No. 615,472

Claims priority, application Germany Oct. 14, 1955

4 Claims. (Cl. 260—431)

This invention relates to and has as its objects the preparation and purification of alkyl mercuric salts, especially of such mercuric salts which are useful as fungicides or germicides. These alkyl mercuric salts correspond to the general formula:

R—Hg—Ac wherein R stands for an alkyl (especially lower alkyl) group and Ac stands for an organic or inorganic acid radical.

Usually alkyl mercuric halides are obtained by reacting mercuric halides with alkyl magnesium halides or by the reaction between metal alkyls and mercuric halides. If salts other than the volatile halides are to be prepared, the halides normally are converted into the corresponding bases (e.g. by treatment with alkali metal hydroxides in methanol or ethanol), and the bases are then converted into the appropriate non-volatile and water soluble salts.

It is furthermore possible to obtain alkyl mercuric salts by decomposition of the mixed alkyl sulfinic acid salts. This reaction is described in co-pending application Serial No. 615,475 entitled: "Process for the Preparation of Alkyl-Mercuric Salts," filed concurrently herewith. According to this process, however, there are obtained solutions of alkyl mercuric salts e.g. of the sulfate, nitrate, acetate which contain, in addition, other salts such as an alkali or alkaline earth salt (e.g. sodium, potassium, calcium, ammonium salts and the like) and purification therefore is desirable.

In accordance with the present invention it has now been found that pure alkyl mercuric salts may be obtained by precipitating from alkaline solutions, the corresponding alkyl mercuric acetylide, and converting these acetylides into appropriate salts which may be soluble in water, alcohols, fatty oils, aromatic or aliphatic hydrocarbons, etc. Diluted or concentrated solutions of alkyl mercuric salts may be used according to this invention and the alkyl mercuric acetylides which are obtained may contain the alkyl mercuric radical either once or twice. For the process of purification of alkyl mercuric salts, this fact is not of substantial importance, since both the mono and dialkyl compounds are insoluble. Retained impurities may be washed out with water. Instead of water, dioxane or lower aliphatic alcohols, especially ethanol and methanol may be used for the purification of the acetylides.

For the preparation of alkyl mercuric salts from the purified acetylides, the latter are suspended in suitable inert solvents such as water; aliphatic alcohols, especially lower aliphatic alcohols, such as methanol, ethanol, isopropanol, etc.; aromatic hydrocarbons, such as benzene, toluene, xylene, aliphatic hydrocarbons, such as hexane, cyclohexane, heptane, octane, and the like. An appropriate acid is added and the reaction mixture is heated slightly. Appropriate acids broadly include inorganic and organic acids such as, hydrochloric acid, sulfuric acid, nitric acid, phosphoric acid, trichloracetic acid, boric acid, acetic acid, propionic acid, butyric acid, stearic acid, palmitic acid, maleic acid, benzoic acid, naphthoic acids and the like. The temperatures in this reaction may vary within the limits of about 30° C. and 150° C.; especially suitable are temperatures from 60 to 90° C. Acetylene evaporates and the insoluble alkyl mercuric acetylide slowly is converted to the new desired alkyl mercuric salt. Sometimes it is advisable to use excess of alkyl mercury acetylide to be sure that all acid has reacted. The desired alkyl mercuric salt may be separated by filtration to remove unreacted acetylide and small amounts of impurities.

The suspension medium preferred for the alkyl mercuric acetylide depends on the nature of the acid for decomposition of the acetylide. If a water-soluble acid is used, the suspension medium is preferably water. If, however, water insoluble acids such as higher fatty acids are used, the reaction preferably is carried out in alcohols, benzene, dioxane and the like.

It is known that organic mercuric compounds in alkaline medium react with acetylene to yield organo mercuric acetylides. It is, however, rather surprising that alkyl mercuric acetylides may be obtained from aqueous alkaline solutions of alkyl mercuric compounds in the presence of possibly other salts or impurities. According to this invention, these alkyl mercuric acetylides are obtained practically quantitively in pure form from any alkaline-reacting solution of alkyl mercuric compounds. Since these pure acetylides may easily be converted into other desirable alkyl mercuric salts, this inventive process for the preparation and purification of alkyl mercuric salts becomes of highly practical importance. This is especially, the case in view of the use of alkyl mercuric compounds as germicides for the protection of seeds and as fungicides for the protection of wood and the like.

The following examples illustrate the present invention without, however, limiting it thereto.

Example 1

3 liters of a phenolphthalein-alkaline solution containing 127.7 g. mercury in the form of methyl mercuric hydroxide (see Example 4 of co-pending application Serial No. 615,475) which contains additionally an appreciable amount of $Na_2SO_4$ is treated with gaseous acetylene until no further precipitate appears. The suspension is thoroughly stirred to avoid the formation of a cake. The methyl mercuric acetylide is filtered off and stirred twice with 1 liter distilled water to remove water-soluble impurities. The purified acetylide is suspended in one liter of $N/2\ H_2SO_4$ and heated to 70° for about 2 to 3 hours. Most of the precipitate disappears and acetylene is evolved. The resulting solution is filtered from impurities and non-reacted acetylide and the filtrate is concentrated to about 150 ml. It is slightly acidic. The methyl mercuric sulfate crystallizes almost pure; it decomposes slightly if heated above 250° C. The salt is soluble in water and slightly soluble in methanol and ethanol.

Example 2

1000 ml. of a crude solution of methyl mercuric salts, which contains $SO_4^-$, $NO_3^-$ and $CH_3COO^-$ anions is treated with sodium hydroxide until the solution reacts alkaline against phenolphthalein. The mercuric content was analytically determined to 7.82%. Acetylene gas is introduced until precipitation ends. The acetylide is collected and purified as described in Example 1 and then suspended in 1.4 liters ethanol. After stirring for 1–2 hours at 50 to 60° C., this suspension is filtered and a solution of 100 g. stearic acid in 1.4 liters hot ethanol is added to the ethanol-dry methyl mercuric acetylide. This suspension is heated for 4 hours at 70 to 80°, whereby an almost clear solution is obtained. The hot reaction mixture is filtered from small amounts of unreacted material and cooled. Methyl mercuric stearate crystallizes. This methyl mercuric stearate melts at 85 to 87° C. and contains 38.8% Hg. A further crop may be obtained by concentrating the mother liquor. The methyl mercuric stearate is almost insoluble in water, readily soluble in hot ethanol and benzene and slightly soluble in the last-mentioned solvents (3% to 4%) at room temperature.

*Example 3*

100 g. butyl mercuric chloride are treated with 2.5 liters of a N/5 Na—OH while stirring. The salt solubilizes almost completely. After filtration from small impurities, acetylene is introduced in the filtrate until precipitation is complete. Separation and purification may be carried out as described above. The acetylide is suspended in 500 ml. water, containing 15 g. acetic acid and heated for 4 hours at 70 to 80° C. The almost clear solution is filtered and concentrated in vacuo to about 80 ml. Butyl mercuric acetate crystallizes and may be collected by filtering with suction. After drying it melts at 55 to 50°. It is readily water-soluble and soluble in methanol or ethanol.

We claim:

1. A process for obtaining a purified alkyl mercuric salt from a solution containing a compound selected from the group consisting of an alkali salt, an alkaline earth salt and an ammonium salt which comprises (a) making the solution alkaline, (b) introducing acetylene into a crude alkaline solution of an alkyl mercuric salt to form an insoluble alkyl mercuric acetylide, (c) separating precipitated alkyl mercuric acetylide and (d) contacting said alkyl mercuric-acetylide with a member selected from the group consisting of an organic acid and an inorganic acid in an inert solvent at a temperature of about 30° C. to about 150° C.

2. Process of claim 1 wherein step (a) is conducted at a temperature of 60° to 90° C.

3. A process for obtaining purified methyl mercuric sulfate from a solution of methyl mercuric hydroxide which also contains sodium sulfate, which comprises passing acetylene into said alkaline solution to form insoluble methyl mercuric acetylide, separating precipitated methyl mercuric acetylide, washing said acetylide with water, suspending said acetylide in sulfuric acid and heating to about 70° C. for several hours, filtering resulting solution and crystallizing methyl mercuric sulfate from the filtrate.

4. A process for the preparation of purified methyl mercuric stearate from a crude solution of methyl mercuric salts, said solution also containing sulfate, nitrate and acetate anions, which comprises rendering the crude solution alkaline against phenolphthalein, passing acetylene into said solution to form insoluble methyl mercuric acetylide, separating precipitated methyl mercuric acetylide, washing said acetylide with water, drying the washed acetylide in alcohol, heating the dried acetylide in an alcoholic solution of stearic for several hours at 70° to 80° C., filtering the reaction mixture and crystallizing methyl mercuric stearate from the filtrate.

References Cited in the file of this patent

UNITED STATES PATENTS

| | | |
|---|---|---|
| 2,145,595 | Gornitz et al. | Jan. 31, 1939 |
| 2,228,752 | Carter | Jan. 14, 1941 |
| 2,251,778 | Bonrath et al. | Aug. 5, 1941 |